United States Patent [19]

Cutler, Jr. et al.

[11] Patent Number: 5,862,478
[45] Date of Patent: Jan. 19, 1999

[54] METHOD AND SYSTEM FOR MANAGING THE INITIATION OF NEW TRAFFIC IN A RESOURCE LIMITED COMMUNICATION SYSTEM

[76] Inventors: Victor Hawes Cutler, Jr., 1233 W. Ellis St., Mesa, Ariz. 85201; Gerald Joseph Davieau, 5418 Huckleberry La., Eldersburg, Md. 21784

[21] Appl. No.: 509,373

[22] Filed: Jul. 31, 1995

[51] Int. Cl.[6] .................................................. H04B 7/185
[52] U.S. Cl. .......................... 455/428; 455/430; 455/67.1
[58] Field of Search ................... 455/12.1, 13.1, 455/422, 428, 429, 430, 435, 436, 450, 452, 453, 509, 510, 517, 67.1, 8, 9, 67.7, 127, 13.2, 13.4

[56] References Cited

U.S. PATENT DOCUMENTS

5,410,740  4/1995  Hagstrom .............................. 455/67.1
5,448,621  9/1995  Knudsen ................................ 455/427
5,490,087  2/1996  Redden et al. ......................... 455/430
5,561,836  10/1996 Sowles et al. ......................... 455/428

*Primary Examiner*—Thanh Cong Le
*Attorney, Agent, or Firm*—Dana B. LeMoine

[57] ABSTRACT

A method and apparatus for controlling the initiation of new user communication links in a communication system (10), by evaluating the present in-use resources in a particular cell against reserved resources for servicing handoff communications from neighboring cells, evaluating total in-use resources of satellite (12), and determining if present conditions in satellite (12) exceed defined parameters thus inhibiting access by new users. A status is posted and transmitted in a broadcast channel (18) for subscriber units (26) to evaluate prior to initiating requests for communication services.

13 Claims, 6 Drawing Sheets

METHOD AND SYSTEM FOR MANAGING THE INITIATION OF NEW TRAFFIC IN A RESOURCE LIMITED COMMUNICATION SYSTEM

TECHNICAL FIELD

This invention relates generally to communication systems and, in particular, to systems and methods for managing users seeking to acquire communication services from a communication system.

BACKGROUND OF THE INVENTION

In communication systems generally, resources are managed by allocating channels to subscriber units as they become available within a given service area. If a subscriber attempts to access the system while all resources are busy, they are generally denied access and are instructed to re-attempt accessing the system at a later time. In cellular communication systems, resources are expanded by partitioning service areas into cells and allowing reuse of communication resources. This reuse permits a greater number of users to access a communication system.

In cellular communication systems, however, subscriber units may be mobile and migrate between partitioned servicing areas. Mobility of subscriber units during a communication session requires handing off communications with a subscriber unit when boundaries of cells are crossed. Such handoffs from a previous cell to a future cell unexpectedly burdens the resources of the future cell. If resources in a future cell are unavailable, then a communication link established by the subscriber unit in a previous cell will be dropped. Such performance is unacceptable in a commercially reliable communication system.

Accordingly, there is a significant need for methods and systems that inhibit acquisition of communication services when resources are at or near capacity and minimize unexpected communication link dropouts due to a deficiency of available resources when handoffs are attempted from a previous cell to a future cell.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

A "satellite" is defined herein to mean a man-made object or vehicle intended to orbit Earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof.

Figure 1:
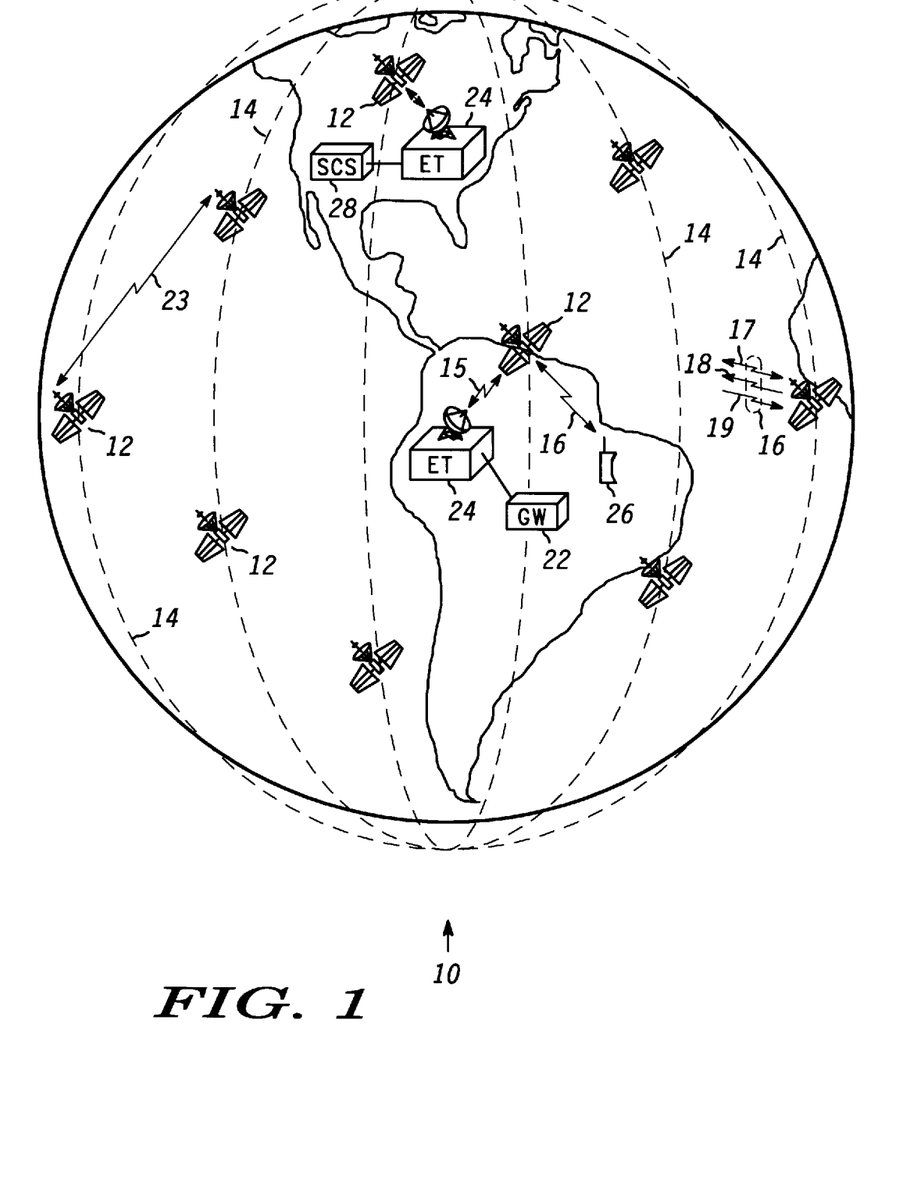
FIG. 1 depicts a highly simplified diagram of a satellite-based communication system of which the present invention may form a portion thereof.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes. The present invention is applicable to systems including satellites having low-Earth, medium-Earth and geo-synchronous orbits. Additionally, it is applicable to orbits having any angle of inclination (e.g., polar, equatorial or other orbital pattern).

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

System 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Broadcast channels 18 may also contain status information regulating access to satellite 12. In the preferred embodiment, this status information informs SUs 26 regarding access denial of new users to satellite 12. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through crosslinks 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
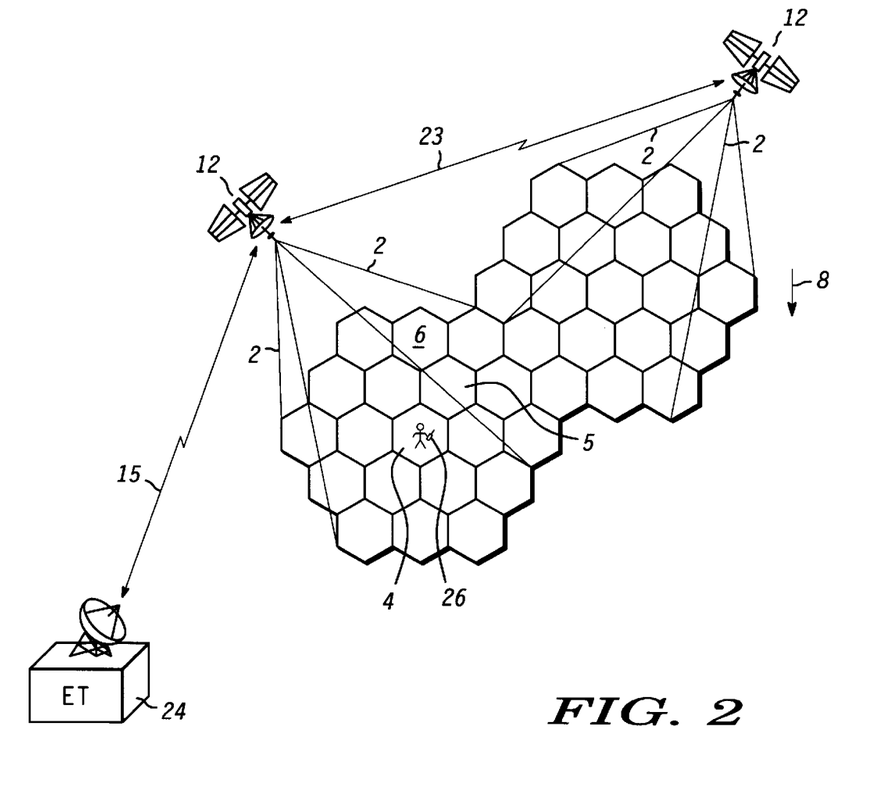
FIG. 2 depicts a satellite-based cellular communication system of which the present invention may form a portion thereof.

FIG. 2 depicts a satellite-based cellular communication system of which the present invention may form a portion thereof. As shown, the communication system comprises earth terminal 24, multi-beam satellite 12 having antenna system 2 and a user with subscriber unit 26. Information destined for a subscriber with subscriber unit 26 is assembled at a gateway and transmitted through an earth terminal 24 with routing instructions. This packaged information is transmitted up to multi-beam satellite 12 and when necessary through crosslink 23 to adjacent satellites 12. The satellite determines from the routing instructions which of its multi-beams is the current servicing beam 4 which is projected onto subscriber unit 26. Satellite 12 then transmits the packet of information to subscriber unit 26.

The satellite constellation is in continuous orbit. As such, servicing beam 4 of satellite 12 tracks the ground in the direction of the satellite orbit 8. Eventually, servicing beam 4 will track past subscriber unit 26. Satellite 12 will then redirect the information packets destined for subscriber unit 26 to a new servicing beam 5. As the process continues, the information packets will eventually be redirected to servicing beam 6.

Figure 3:
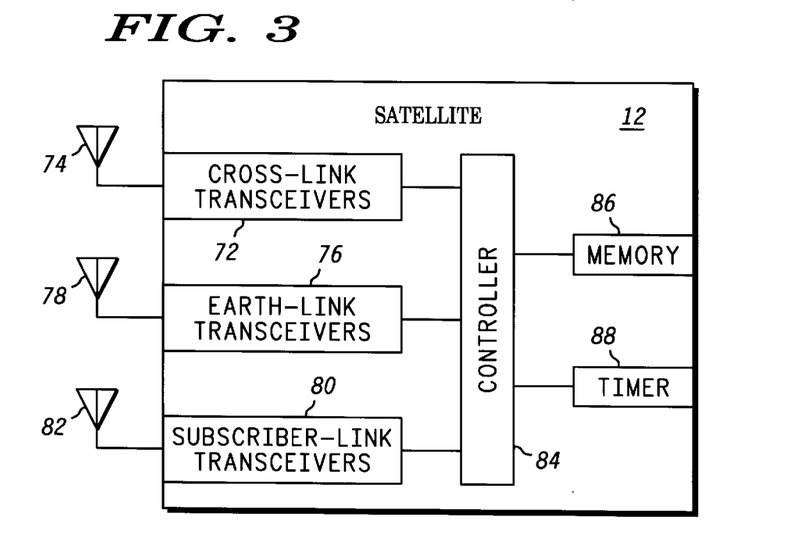
FIG. 3 illustrates a simplified block diagram of a satellite radio communication station suitable for use in a preferred embodiment of the present invention.

FIG. 3 illustrates a simplified block diagram of a satellite radio communication station suitable for use in a preferred embodiment of the present invention. Preferably, all satellites 12 within system 10 (see FIG. 1) include equipment as illustrated by the block diagram of FIG. 4. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Subscriber unit transceivers 80 and associated antennas 82 support subscriber units 26 (FIG. 1). Preferably, each satellite 12 may simultaneously support a link for up to several thousand or more subscriber units 26 (FIG. 1). Of course; those skilled in the art will appreciate that antennas 74, 78, and 82 may be implemented either as single multi-directional antennas or as banks of discrete antennas. It is desirable that each subscriber link antenna 82 be a phased array antenna capable of accessing many cells simultaneously.

A controller 84 couples each of transceivers 72, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber unit transceivers 80 are desirably multi-channel FDMA/TDMA transceivers capable of transmitting and receiving on all different selectable frequencies during particular, selectable, time slots as directed by controller 84. Subscriber unit transceivers 80 contain multi-channel radios having sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions. Subscriber unit transceivers 80 desirably provide for transmission and reception on any frequency channel set so that each subscriber unit transceivers 80 may, if needed, utilize the entire spectral capacity of all frequency channel sets by having the capability to handle all frequency and time slot assignments.

Figure 4:
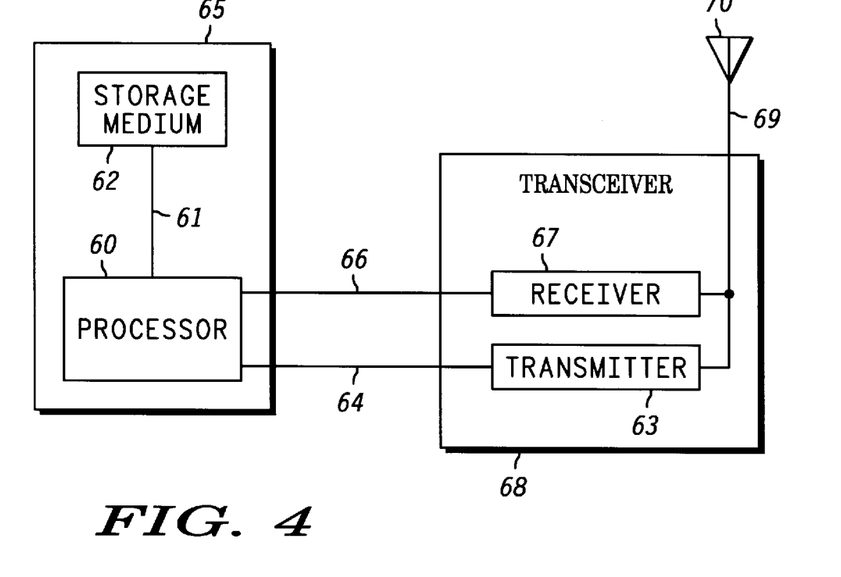
FIG. 4 illustrates a simplified block diagram of a system control station and an earth terminal suitable for use in a preferred embodiment of the present invention.

FIG. 4 illustrates a simplified block diagram of a system control station and an earth terminal suitable for use in a preferred embodiment of the present invention. Control station 65 and terrestrial station 68 are desirable part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages user access, message reception and transmission, channel set-up, radio tuning, frequency and time slot assignment, and other cellular radio communication and control functions not managed or provided for by controller 84 (FIG. 3). Among other things, processor 60 and/or controller 84 (FIG. 3) desirably executes procedures to allow user access to communication system 10. This may include procedures for protocols for channel setup and other associated functions as discussed below.

Figure 5:
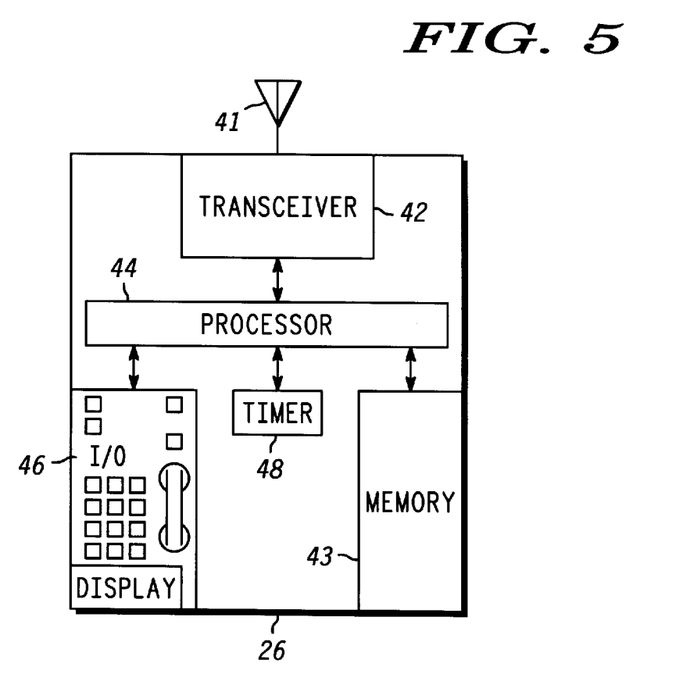
FIG. 5 illustrates a simplified block diagram of a subscriber unit suitable for use in a preferred embodiment of the present invention.

FIG. 5 illustrates a simplified block diagram of a subscriber unit suitable for use in a preferred embodiment of the present invention. Subscriber unit 26 (analogous to subscriber unit 26 of FIG. 1) communicates with communication system 10, and may also communicate through communication system 10 to other SUs 26 or another communication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of ordinary skill in the art will understand that the acquisition channel transceiver portion, the broadcast channel receiver portion and the traffic channel transceiver portion may be contained in one unit capable of all three functions.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated during the operation of subscriber unit 26.

Conventional cellular radio units and systems are described for example in U.S. Pat. Nos. 4,783,779, 4,144, 412, and 5,097,499, and satellite communication systems are described for example in U.S. Pat. Nos. 4,722,083 and 4,819,227. These patents are herewith incorporated by reference. Subscriber unit antennas 82 (FIG. 3), subscriber unit transceivers 80 (FIG. 3), satellite control station 28 (FIG. 1) and earth terminal 24 (FIG. 1) perform those functions and contain at least those equipment conventionally associated with switched terrestrial or satellite cellular communication systems, plus additional functions and equipment explained in more detail below.

Figure 6:
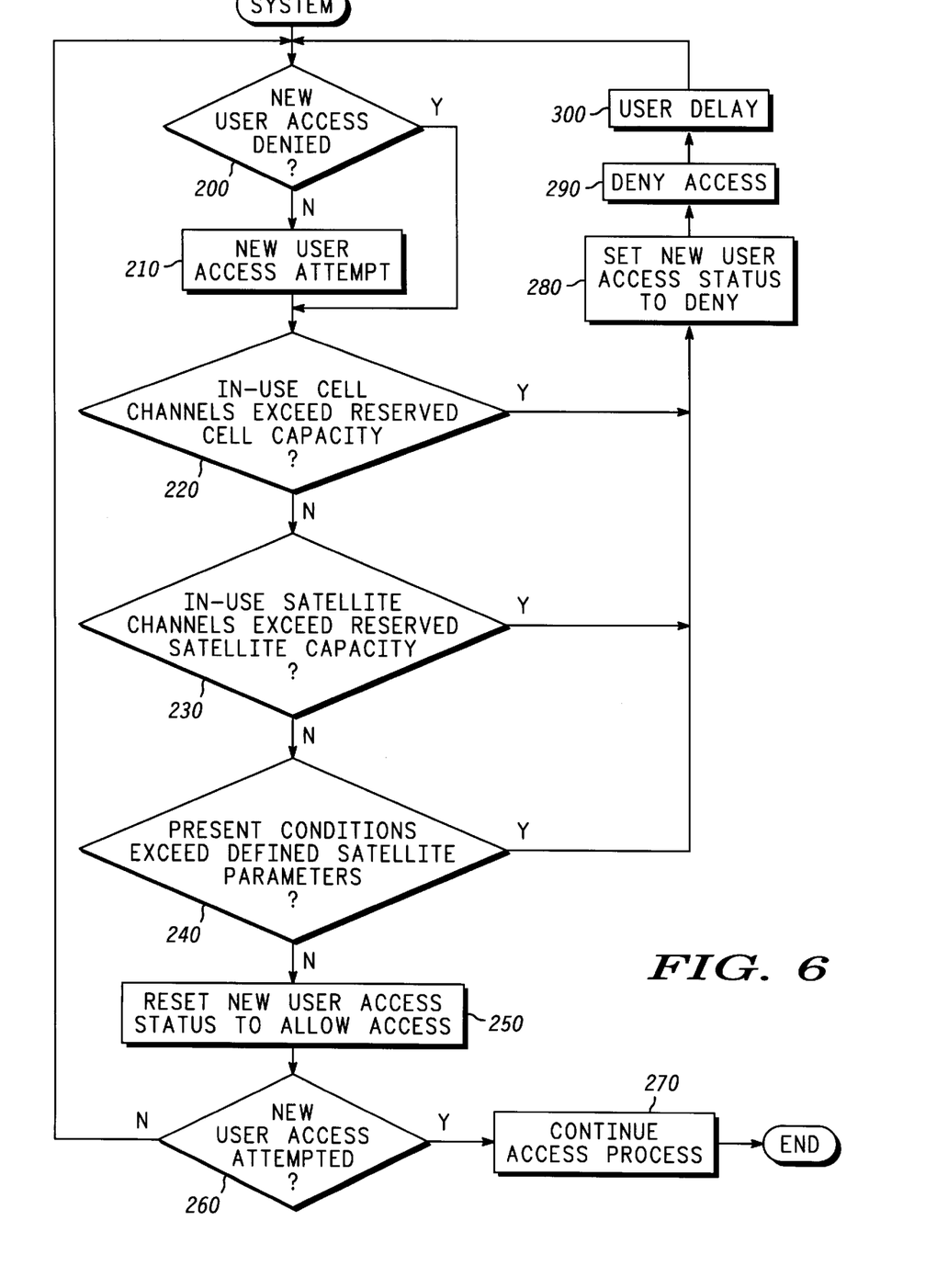
FIG. 6 shows a flow chart for operating a communication system for use in regulating an attempt by a user to acquire services from a communication system for use in a preferred embodiment of the present invention.

FIG. 6 shows a flow chart for operating a communication system for use in regulating an attempt by a user to acquire services from a communication system for use in a preferred embodiment of the present invention.

In communication system 10, a new user attempts to establish communications by initiating a query task 200. In task 200, a new user monitors broadcast channel 18 (FIG. 1) to determine if access to resources is denied. Broadcast channel 18 contains a posting as determined by either a gateway or a satellite of a new user access status. Broadcast channel 18 may contain new user access status information governing new user access in each transmission of broadcast channel 18 or in a less frequent broadcast of status information. A new user will be denied access to communication resources when satellite 12 or gateway 22 determines that resources are either in use by existing users of SUs 26 or that resources are reserved for other uses such as receiving communications from an SU 26 in another cell during a handoff process.

When task 200 determines that new users are not denied access, a task 210 is performed allowing a new user to access the system. Subscriber unit 26 communicates with satellite 12 to establish communication parameters and access privileges. This access attempt by subscriber unit 26 does not insure communication resources will be granted to subscriber unit 26 as resources may have recently been granted to another subscriber unit.

A query task 220 is performed following task 210 or in response to denial of new user access task 200. Although satellite 12 and gateway 22 have no insight into the denial of a new user attempt since subscriber unit 26 does not transmit upon denial of a user access denial, either gateway 22 or satellite 12 periodically evaluate communication resources to determine the status of the resources. A task 220 evaluates a cell's in-use resources (e.g., channels) to determine if the quantity of these in-use channels impinges upon the reserved cell resources set aside by satellite 12 in the cell to handle handoffs from neighboring cells having established communication links requiring handoffs to different cells. This reserved cell capacity is denoted by a reserve threshold value.

Resource management may be performed on the ground in a gateway or in a satellite. A threshold is determined by analysis of the handoff requirements of adjacent cells. This determination of reserve resources may be very dynamic or reserve threshold values may be static.

When task 220 determines that the reserved resource capacity of a cell was not impinged upon, a query task 230 is performed. A task 230 evaluates the in-use resources of a satellite to determine if the quantity of these in-use channels impinges upon the reserved satellite resources set aside by satellite 12 to handle communication links handed off from other satellites. Satellite 12 may reserve satellite capacity for dynamic reallocation for high density cells, or in an orbiting satellite communication system, a satellite may reserve capacity to insure that new users are not denied access for an extended period of time.

When task 230 determines that the reserved resource capacity of a satellite is not impinged upon, a query task 240 may be performed. A task 240 determines if satellite parameters other than channel capacity are impinged upon. Other satellite parameters that may be evaluated include overall satellite power consumption. In many satellite applications, overrunning a predefined power budget of a rechargeable battery can have long term effects on the longevity of a satellite's battery. Other protective metrics may include rate of discharge of a satellite's power, or rate of access of new users to accommodate channel reallocation.

When either task 220, 230, or 240 determines that reserved capacities are being impinged upon or that present conditions exceed defined satellite parameters, then a task 280 is performed. In task 280, the status as transmitted by broadcast channel 18, is set to deny access to new users by posting the status as described above.

A task 290 denies access to the system by terminating any further communication with subscriber unit 26. This denial may be in the form of a formal response or simply by dropping the communication link and requiring subscriber unit 26 to begin performing the step of monitoring broadcast channel 18.

A task 300 is then performed by a new user or by a lockout by subscriber unit 26. This delay may prevent an immediate re-attempt by a new user to access the system before the new user access deny status may be updated.

When task 240 determines that satellite parameters have not been exceeded, then a task 250 is performed. Task 250 resets the status transmitted by broadcast channel 18 to allow access of new users having SUs 26.

A query task 260 determines if a new user is attempting to access the system. If a new user is not attempting to access the system, then processing proceeds to query task 200 to reevaluate the present state of the system. If a new user is attempting to access the system, then processing passes to a task 270 and acquisition of communication parameters and channel assignment proceed. This acquisition process is outside the scope of this invention, but generally includes the process of refining communication parameters such as transmission timing adjustments to compensate for propagation timing and refinement of transmission frequencies to accommodate Doppler frequencies associated with orbiting satellite dynamics.

Figure 7:
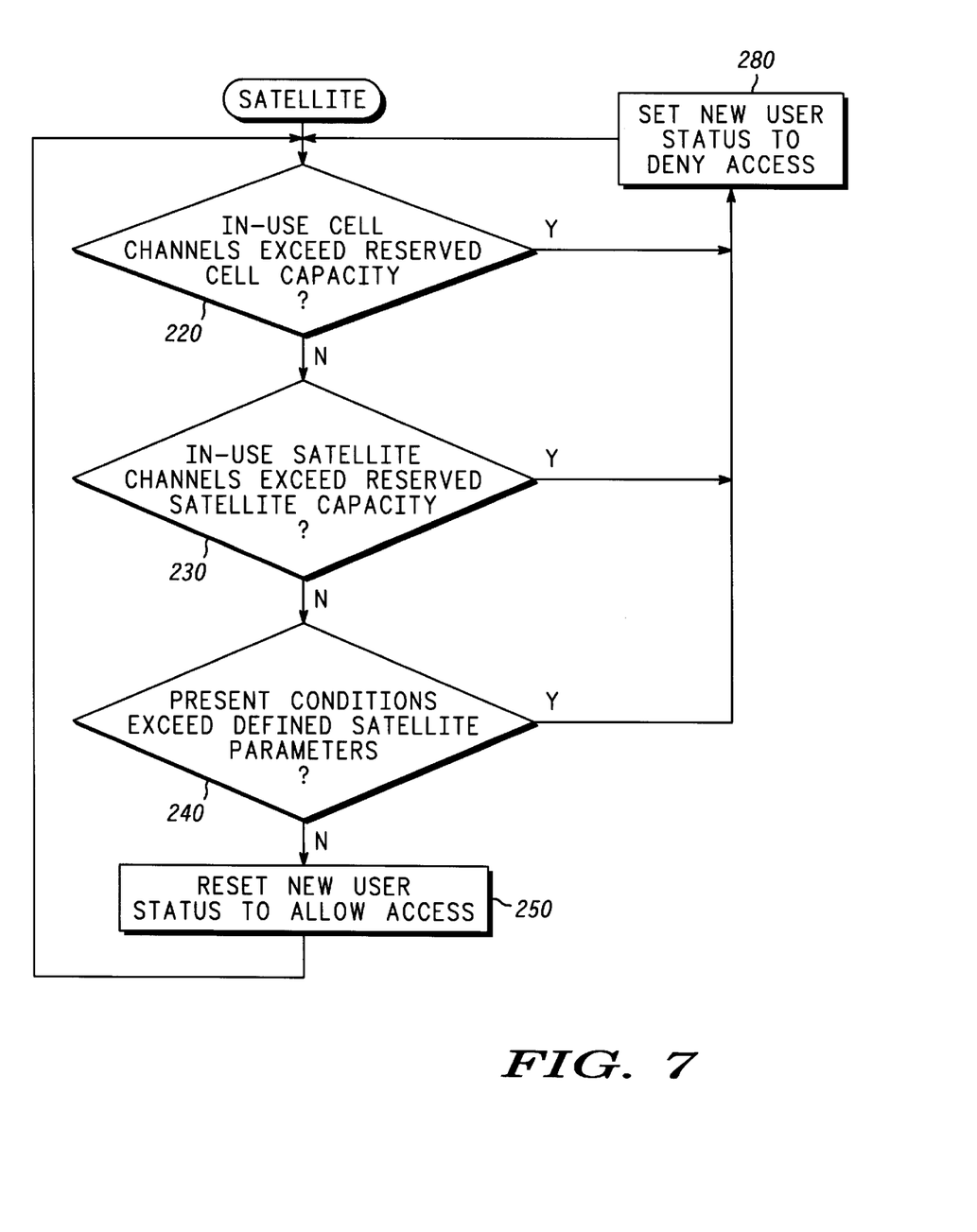
FIG. 7 shows a flow chart for operating a satellite in a communication system for use in regulating an attempt by a user to acquire services from a communication system for use in a preferred embodiment of the present invention.

FIG. 7 shows a flow chart for operating a satellite in a communication system for use in regulating an attempt by a user to acquire services from a communication system for use in a preferred embodiment of the present invention. A satellite 12 performs a task 220 wherein satellite 12 evaluates a cell's in-use channels to determine if the quantity of these in-use channels impinges upon the reserved cell resources set aside by satellite 12 in the cell to handle handoffs from neighboring cells having established communication links.

When task 220 determines that the reserved capacity of a cell was not impinged upon, a query task 230 is performed. A task 230 evaluates the in-use resources of satellite 12 to determine if the quantity of these in-use channels impinges upon the reserved satellite resources set aside by satellite 12 to handle communication links handed-off from other satellites. A satellite may reserve satellite capacity for dynamic reallocation for high density cells, or in an orbiting satellite communication system, a satellite may reserve capacity to insure that new users are not denied access for an extended period of time.

When task 230 determines that the reserved capacity of a satellite is not impinged upon, a query task 240 may be performed. A task 240 determines if satellite parameters other than channel capacity are impinged upon. Other satellite parameters that may be evaluated include, among other things, overall satellite power consumption. In many satellite applications, over-discharging a defined power budget of a rechargeable battery can have long term effects on the longevity of a satellite's battery. Other protective metrics may include rate of discharge of a satellite's power, or rate of access of new users to accommodate dynamic channel reallocation.

A task 280 is performed when either task 220, 230, or 240 determines that reserved capacities are being impinged upon or that present conditions exceed defined satellite parameters. In task 280, the status as transmitted by broadcast channel 18, is set to deny access to new users by posting the status in broadcast channel 18 as describe above.

A task 250 is performed when task 240 determines that satellite parameters have not been exceeded. Task 250 resets the status transmitted by broadcast channel 18 to allow access by new users.

Figure 8:
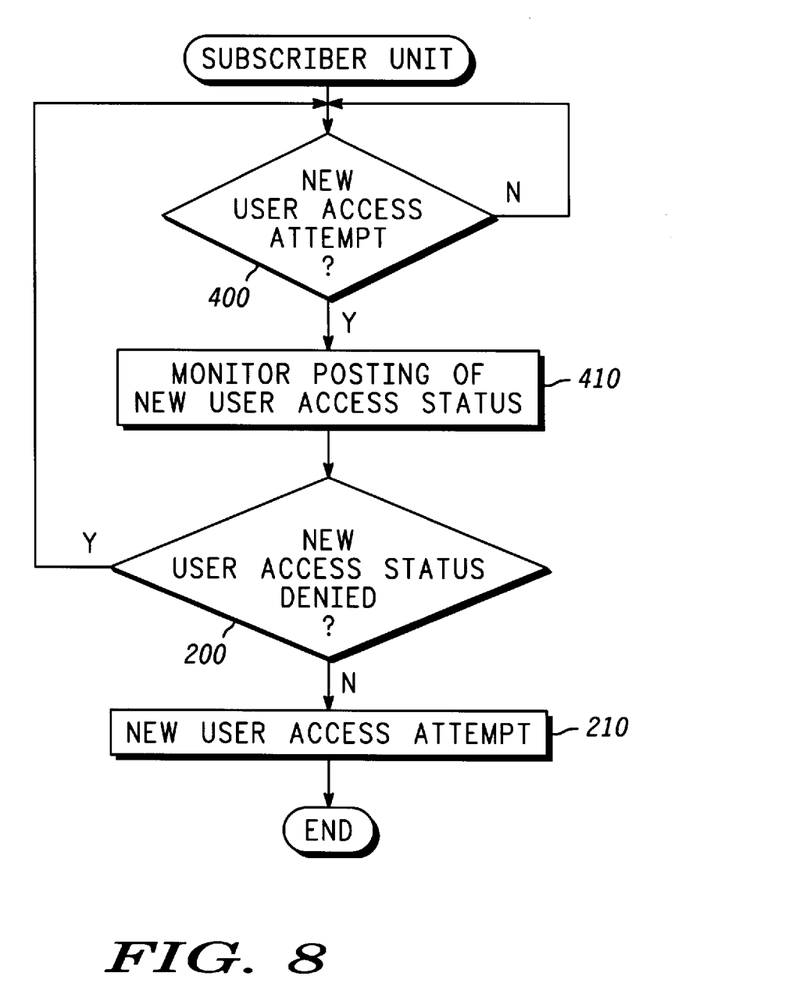
FIG. 8 shows a flow chart for operating a subscriber unit in a communication system for use in regulating an attempt by a user to acquire services from a communication system for use in a preferred embodiment of the present invention.

FIG. 8 shows a flow chart for operating a subscriber unit in a communication system for use in regulating an attempt by a user to acquire services from a communication system for use in a preferred embodiment of the present invention.

A subscriber unit 26 performs a task 400 to evaluate if a user of subscriber unit 26 has initiated an access. When a new user has initiated access, a task 410 is performed to monitor broadcast channel 18 and receive the new user status as transmitted therein.

A query task 200 evaluates the new user status and if the status is set to deny new user access, then processing returns to task 400 to evaluate a renewed attempt by a user of subscriber unit 26. If access is not denied, then processing passes to a task 210. In task 210, subscriber unit 26 initiates communication with satellite 12 with both satellite 12 and subscriber unit 26 attempting to cooperatively establish a communication link. As described in FIG. 6, however, satellite 12 may reevaluate the available resources and still deny the establishment of a communication link based upon the immediate status of available resources.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide improved methods and systems for initiating and managing the access of new users in a resource limited communication system. These advantages include improved user regulation by denying access prior to complex subscriber unit and satellite acquisition. The advantages also include improved call continuation by reserving communication resources for receiving handed-off calls originating in neighboring cells or satellites.

What is claimed is:

1. A method for managing communication resources by restricting access of a new user in a communication system comprising at least one satellite, said method comprising the steps of:

posting a new user access status, said new user access status denoting accessibility to said communication resources of said communication system by said new user;

prohibiting said new user from accessing said system when said new user access status prohibits said new user from accessing said system;

evaluating a current status of said system when said new user access status does not prohibit said new user from accessing said system, wherein said current status comprises power consumption of said at least one satellite;

when said power consumption of said at least one satellite exceeds a predefined power consumption, setting said new user access status to deny said new user from accessing said communication system;

responding to said new user access status; and updating said new user access status according to dynamic conditions in said communication system.

2. A method as recited in claim 1, said method further comprising the steps of:

said evaluating step comprising the step of comparing in-use cell channels against a reserved cell capacity; and when said in-use cell channels exceeds said reserved cell capacity, said updating step comprising the step of setting said new user access status to deny said new user from accessing said communication system.

3. A method as recited in claim 2, said method further comprising the steps of:

said evaluating step further comprising the step of comparing in-use satellite channels against a reserved satellite capacity; and when said in-use satellite channels exceeds said reserved satellite capacity, said updating step comprising the step of setting said new user access status to deny said new user from accessing said communication system.

4. A method as recited in claim 3, said method further comprising the steps of:

said evaluating step further comprising the step of comparing a satellite present parameter against a satellite defined parameter; and when said satellite present parameter exceeds said satellite defined parameter, said updating step comprising the step of setting said new user access status to deny said new user from accessing said communication system.

5. A method as recited in claim 4, said method further comprising the step of:

when said updating step does not set said new user access status to deny, said updating step comprising the step of resetting said new user status to allow said new user to access said communication system.

6. A method as recited in claim 1 wherein said responding step comprises the steps of:

when said new user access status is set to deny said new user from accessing said communication system, said new user abstaining access to said communication system; and when said new user access status is reset to allow said new user to access said communication system, said new user initiating access to said communication system.

7. A method as recited in claim 1, wherein said posting step comprises the step of:

transmitting said new user access status on a broadcast channel of said communication system.

8. A method for managing communication resources by restricting access of a new user in a communication system comprising at least one satellite, said method comprising the steps of:

posting a new user access status, said new user access status denoting accessibility to said communication resources of said communication system by said new user;

prohibiting said new user from accessing said system when said new user access status prohibits said new user from accessing said system;

evaluating a current status of said system when said new user access status does not prohibit said new user from accessing said system, wherein said current status comprises a rate of discharge of said at least one satellite's power; and when said rate of discharge of said at least one satellite's power exceeds a predefined rate, updating said new user access status to deny said new user from accessing said communication system.

9. A method as recited in claim 8, said method further comprising the steps of:

said evaluating step comprising the step of comparing in-use cell channels against a reserved cell capacity; and when said in-use cell channels exceeds said reserved cell capacity, said updating step comprising the step of setting said new user access status to deny said new user from accessing said communication system.

10. A method as recited in claim 8, said method further comprising the steps of:

said evaluating step further comprising the step of comparing in-use satellite channels against a reserved satellite capacity; and when said in-use satellite channels exceeds said reserved satellite capacity, said updating step comprising the step of setting said new user access status to deny said new user from accessing said communication system.

11. A method as recited in claim 8, said method further comprising the steps of:

said evaluating step further comprising the step of comparing a satellite present parameter against a satellite defined parameter; and when said satellite present parameter exceeds said satellite defined parameter, said updating step comprising the step of setting said new user access status to deny said new user from accessing said communication system.

12. A method as recited in claim 8, said method further comprising the step of:

when said updating step does not set said new user access status to deny, said updating step comprising the step of resetting said new user status to allow said new user to access said communication system.

13. A method as recited in claim 8, wherein said posting step comprises the step of:

transmitting said new user access status on a broadcast channel of said communication system.

* * * * *